US006169766B1

United States Patent
Aoki et al.

(10) Patent No.: US 6,169,766 B1
(45) Date of Patent: Jan. 2, 2001

(54) METHOD AND APPARATUS FOR DETECTING MOTION VECTOR AND IMAGE CODING APPARATUS

(75) Inventors: Katsuji Aoki, Kanagawa; Akihiko Ohtani; Toshiyuki Araki, both of Osaka, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/139,653

(22) Filed: Aug. 25, 1998

(30) Foreign Application Priority Data

Aug. 26, 1997 (JP) .................................................. 9-229220

(51) Int. Cl.[7] ...................................................... H04N 7/12

(52) U.S. Cl. ........................................ 375/240.16; 348/699

(58) Field of Search .............. 375/240.16; 348/699–700, 348/402.1, 407.1, 413.1, 416.1; 382/236, 238, 239

(56) References Cited

U.S. PATENT DOCUMENTS

| 5,712,799 | * | 1/1998 | Framwald et al. | 364/514 |
| 5,731,850 | * | 3/1998 | Maturi et al. | 348/699 |
| 5,825,426 | * | 10/1998 | Wickstrom et al. | 348/425 |

FOREIGN PATENT DOCUMENTS

| 0 732 670 | 9/1996 | (EP) | G06T 7/20 |
| 63296583 | 12/1988 | (JP) | H04N 7/12 |
| 02033286 | 2/1990 | (JP) | H04N 7/12 |
| 05049023 | 2/1993 | (JP) | H04N 7/12 |
| 07107486 | 4/1995 | (JP) | H04N 2/32 |
| 09023422 | 1/1997 | (JP) | H04N 7/24 |
| 9-162747 | 6/1997 | (JP) | H04N 7/32 |
| 09200542 | 7/1997 | (JP) | H04N 7/32 |
| 10-51793 | 2/1998 | (JP) | H04N 7/32 |
| WO94/03014 | 2/1994 | (WO) | H04N 7/18 |

OTHER PUBLICATIONS

Francis et al, "Subsampling the search space for fast block motion estimation", Proceedings of the 1997 South African Symposium on Communications and Signal Processing, Sep. 1997.*

Chan et al, "New adaptive decimation for block motion vector estimation", IEEE Transactions on Circuits and Systems for Video Technology, vol. 6, iss. 1, Feb. 1996.*

Chan et al, "A block motion vector estimation using pattern based pixel decimation", Proceedings of 1997 IEEE International Symposium on Circuits and Systems, vol. 2, Jun. 1997.*

K. Hildenbrand et al., "Motion Estimation in the HERMES Videocodec Frequenz", vol. 47, No. 11/12, Nov. 1993, pp. 303–309.

A. Zaccarin et al., "Fast Algorithms for Block Motion Estimation", Multidimensional Signal Processing, Mar. 1992, vol. III. pp. 449–452, IEEE.

* cited by examiner

Primary Examiner—Vu Le
(74) Attorney, Agent, or Firm—McDermott, Will & Emery

(57) ABSTRACT

In detecting a motion vector, sub-sampling is more selectively and adaptively set in terms of power consumption and detection performance. A correlation calculation section includes a plurality of correlation calculation blocks, each calculating correlation between a block to be coded and an associated candidate block within a search range. Each correlation calculation block is supplied with a different group of pixels of the block to be coded and an associated group of pixels of the associated candidate block, and calculates the correlation between the two groups of pixels supplied. A control section selectively sets sub-sampling in accordance with image feature information such as the frequency components of the block to be coded or operating state information such as the power left in a battery. And, in accordance with the setting of sub-sampling, the control section selectively operates part or all of the correlation calculation blocks of the correlation calculation section.

21 Claims, 8 Drawing Sheets

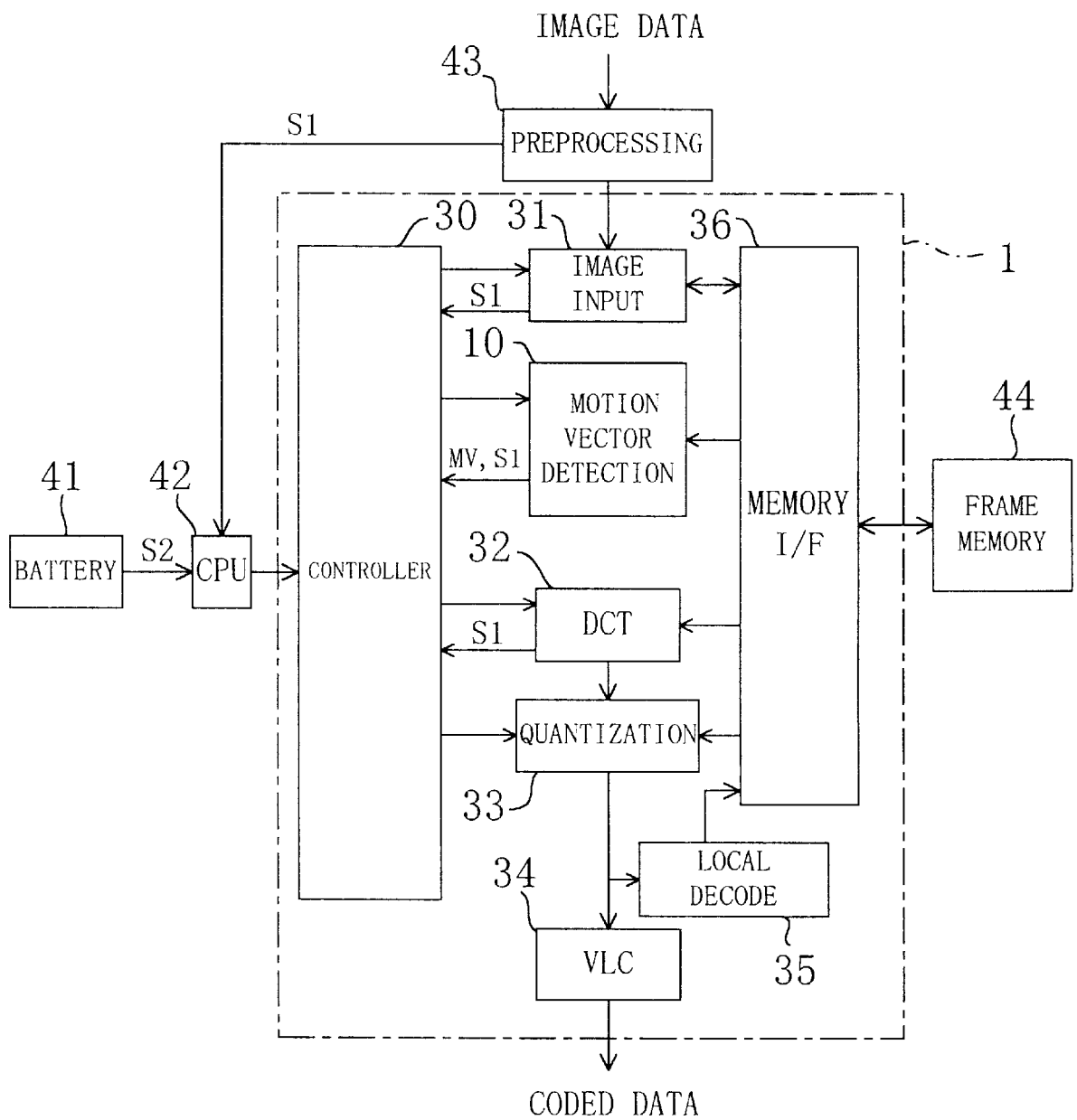

METHOD AND APPARATUS FOR DETECTING MOTION VECTOR AND IMAGE CODING APPARATUS

BACKGROUND OF THE INVENTION

The present invention relates to technology for efficiently detecting a motion vector during the motion compensated coding of a moving picture.

A block matching method is generally used for detecting a motion vector out of a moving picture. FIG. 8 is a conceptual diagram illustrating a block matching method. As shown in FIG. 8, according to the block matching method, an estimated value representing correlation is first calculated between an image component included in a block to be coded, out of which the motion vector is to be detected, and an image component in each candidate block within a search range, which block has the same size as the block to be coded. Then, the displacement from a block, located at the same position as the block to be coded, to a candidate block having the highest correlation represented by the estimated value is defined as the motion vector. As the estimated value of correlation, a total sum of the absolute values of differences between pairs of mutually associated pixels in the pair of blocks is used, for example. In this case, the higher the correlation between the image components (i.e., pixels) is, the smaller the estimated value becomes.

In the block matching method, the estimated values are calculated between a single block to be coded and many candidate blocks within the search range. Thus, in order to obtain the numerous estimated values, a huge quantity of calculation is required. As a result, the power consumed by a motion vector detecting apparatus is also enormous.

In detecting a motion vector in accordance with the block matching method, various techniques are employed for reducing the quantity of estimated value calculation and thereby reduce the power consumption. Sub-sampling (decimation) is one of such techniques. In accordance with the sub-sampling method, some pixels of a block to be coded and the counterparts of the blocks within the search range are decimated, and a motion vector is obtained with respect to the decimated images by the block matching method. In the sub-sampling method, if the number of pixels included in the block to be coded is reduced to 1/N (where N is a positive integer) through decimation, then the quantity of estimated value calculation is also reduced to 1/N. As a result, the power consumption can also be reduced to about 1/N.

However, since some pixels are decimated from the block to be coded and the respective blocks within the search range in accordance with the sub-sampling method, it is probable that the decimated image loses the detailed features of the original image. Thus, as compared with a case of not using sub-sampling, the quantity of estimated value calculation can be reduced, but the performance of motion vector detection is inferior. Nevertheless, as the case may be, the reduction of the quantity of estimated value calculation and the power consumption is preferred even if the performance of motion vector detection is deteriorated to a certain degree.

SUMMARY OF THE INVENTION

The object of the present invention is selectively and more adaptively setting sub-sampling than conventional technology in terms of detection performance and power consumption.

Specifically, the present invention is embodied in a motion vector detecting apparatus. The motion vector detecting apparatus includes: first image storage means for storing an image of a block to be coded; second image storage means for storing an image within a search range; correlation calculation means including a plurality of correlation calculation blocks for calculating correlation between the block to be coded and each associated candidate block within the search range, each said correlation calculation block being supplied with a different group of pixels out of the block to be coded from the first image storage means and an associated group of pixels of each said associated candidate block from the second image storage means and calculating the correlation between the two groups of pixels supplied; control means for controlling the correlation calculation means by selectively operating at least one of the correlation calculation blocks; and correlation determination means for determining the correlation between the block to be coded and each said associated candidate block based on an output of the correlation calculation block operated in accordance with the control of the control means.

The control means preferably selects at least one of the correlation calculation blocks in accordance with image feature information of the block to be coded or operating state information of the motion vector detecting apparatus.

The present invention is also embodied in a method for detecting a motion vector. The method includes the steps of: a) calculating correlation between a block to be coded in a target frame and each associated candidate block within a search range in a search frame; and b) detecting the motion vector of the block to be coded based on the correlation calculated in the step a). In the step a), sub-sampling during the calculation of correlation is selectively set in accordance with image feature information of the block to be coded.

The frequency components of the block to be coded are preferably used as the image feature information. Alternatively, the DCT components or the motion vector of a block in a frame previous to the target frame may also be used as the image feature information. The block in the previous frame is preferably located at the same position as or in the vicinity of the block to be coded.

Another method for detecting a motion vector according to the present invention includes the steps of: a) calculating correlation between a block to be coded in a target frame and each associated candidate block within a search range in a search frame; and b) detecting the motion vector of the block to be coded based on the correlation calculated in the step a). In the step a), sub-sampling during the calculation of correlation is selectively set in accordance with operating state information of an apparatus implementing the method.

Information indicating whether the apparatus implementing the method is operated in a mobile state or in an immobile state is preferably used as the operating state information. Alternatively, information indicating the power left in a battery functioning as a power supply for the apparatus implementing the method may also be used as the operating state information.

The present invention is further embodied in an image coding apparatus for performing motion compensated coding on a moving picture. The image coding apparatus includes a motion vector detecting section for calculating correlation between a block to be coded in a target frame and each associated candidate block within a search range in a search frame and thereby detecting the motion vector of the block to be coded based on the correlation calculated. The motion vector detecting section selectively sets sub-sampling during the calculation of the correlation in accordance with image feature information of the block to be coded.

The image coding apparatus preferably further includes a DCT section for performing a discrete cosine transform on an image. The motion vector detecting section preferably selectively sets sub-sampling by using DCT components of a block in a frame previous to the target frame as the image feature information. The DCT components are obtained by the DCT section, and the block in the previous frame is located at the same position as or in the vicinity of the block to be coded.

The motion vector detecting section preferably selectively sets sub-sampling by using a motion vector of a block in a frame previous to the target frame as the image feature information. The block in the previous frame is located at the same position as or in the vicinity of the block to be coded.

BRIEF DESCRIPTION OF THE DRAWINGS

FIG. 3 is a block diagram illustrating an exemplary image coding apparatus including the motion vector detecting apparatus shown in FIG. 1.

DETAILED DESCRIPTION OF THE INVENTION

Figure 1:
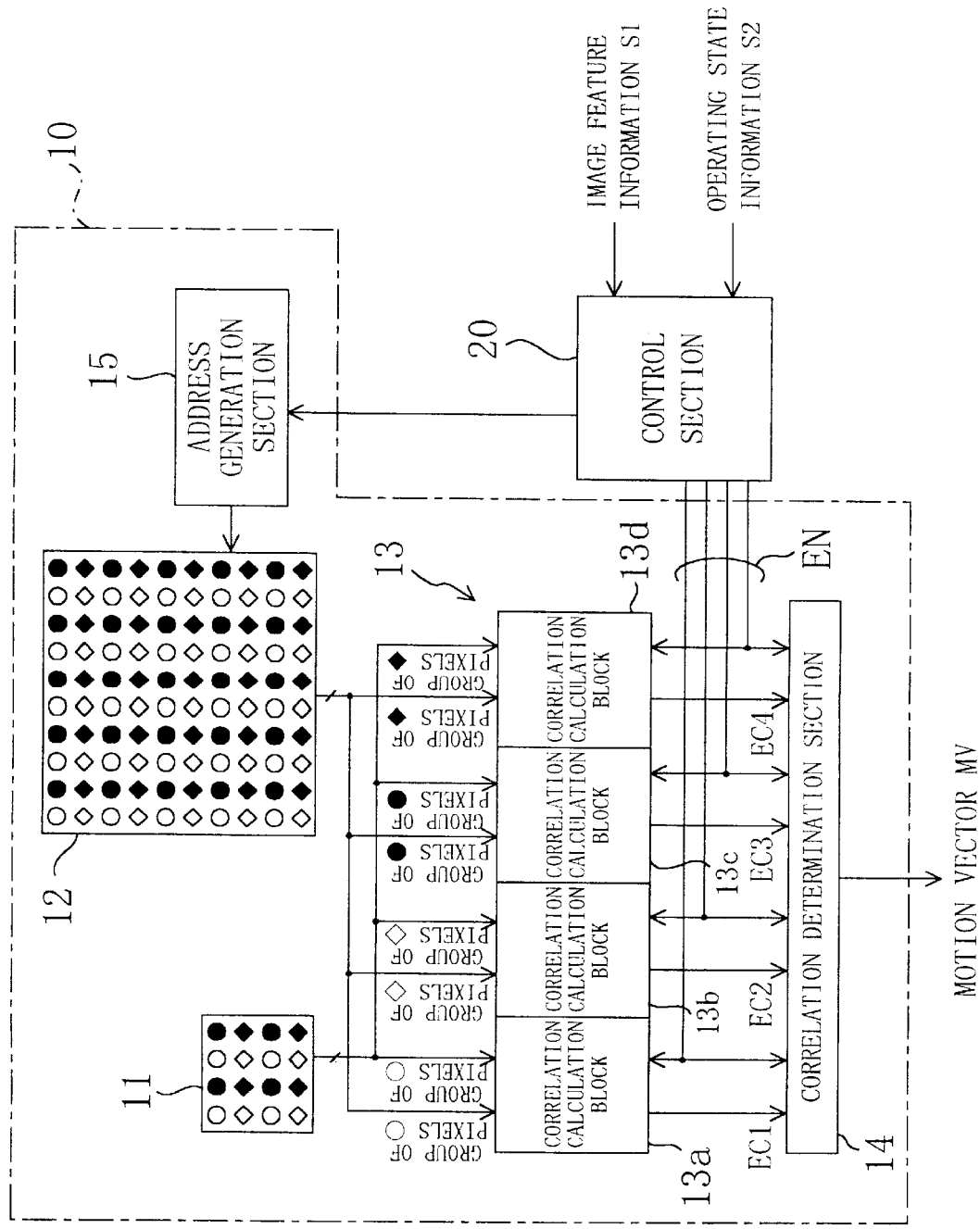
FIG. 1 is a block diagram illustrating the configuration of a motion vector detecting apparatus in one embodiment of the present invention.

FIG. 1 is a block diagram illustrating the configuration of a motion vector detecting apparatus in one embodiment of the present invention. In FIG. 1, the reference numeral 11 denotes a first image storage section for storing the image of a block to be coded. 12 denotes a second image storage section for storing an image within a search range. And 13 denotes a correlation calculation section, including four correlation calculation blocks 13a through 13d, for calculating the correlation between the block to be coded and candidate blocks within the search range. Each of the first to fourth correlation calculation blocks 13a through 13d is supplied with a different group of pixels of the block to be coded from the first image storage section 11 and an associated group of pixels of the candidate block from the second image storage section 12. And each correlation calculation block calculates the correlation between the two groups of pixels supplied. As an estimated value of correlation, a total sum of absolute values of differences between the pixels is used.

In this embodiment, pixels can be sub-sampled every other pixel both horizontally and vertically. Thus, the pixels stored in the first image storage section 11 are classified into the four groups of: Group of Pixels ○, Group of Pixels ◇, Group of Pixels ● and Group of Pixels ◆. Group of Pixels ○ are supplied to the first correlation calculation block 13a. Group of Pixels ◇ are supplied to the second correlation calculation block 13b. Group of Pixels ● are supplied to the third correlation calculation block 13c. And Group of Pixels ◆ are supplied to the fourth correlation calculation block 13d. The destination of each group of pixels stored in the second image storage section 12 is variable depending upon the setting of the candidate blocks. Addressing of the second image storage section 12 is performed by an address generation section 15.

The reference numeral 20 denotes a control section for selectively operating part or all of the first to fourth correlation calculation blocks 13a through 13d by supplying an enable signal EN. In accordance with the image feature information S1 of the block to be coded or the operating state information S2 of the motion vector detecting apparatus, the control section 20 selects either a mode in which all of the first to fourth correlation calculation blocks 13a through 13d are operated or a mode in which part of the first to fourth correlation calculation blocks 13a through 13d is/are operated. If sub-sampling is not performed during motion vector detection, all of the first to fourth correlation calculation blocks 13a through 13d are operated. On the other hand, if sub-sampling is performed during the motion vector detection, part of the first to fourth correlation calculation blocks 13a through 13d is/are operated.

The reference numeral 14 denotes a correlation determination section for determining the correlation between the block to be coded and the candidate blocks based on the outputs EC1 through EC4 of the first to fourth correlation calculation blocks 13a through 13d operated in accordance with the control of the control section 20. The correlation determination section 14 outputs a motion vector MV based on the correlation between the block to be coded and the candidate blocks.

Figure 2:
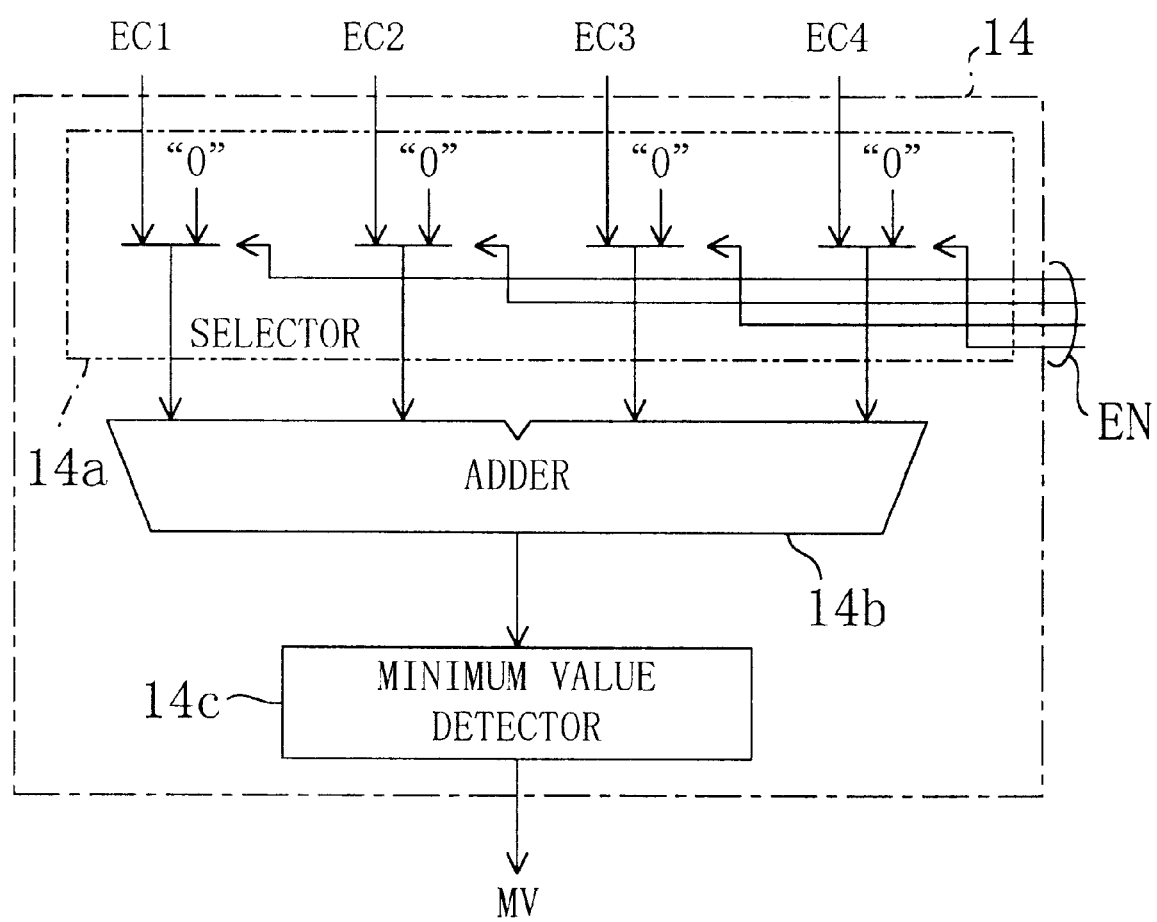
FIG. 2 is a block diagram illustrating the configuration of a correlation determination section shown in FIG. 1.

FIG. 2 is a block diagram illustrating the configuration of the correlation determination section 14 shown in FIG. 1. In FIG. 2, the reference numeral 14a denotes a selector for selecting any of the outputs EC1 through EC4 of the first to fourth correlation calculation blocks 13a through 13d and a numerical value "0" in response to the enable signal EN. The reference numeral 14b denotes an adder as an arithmetic unit for adding the output values of the selector 14a. And the reference numeral 14c denotes a minimum value detector for detecting the minimum value out of the outputs of the adder 14b.

Hereinafter, the operation of the motion vector detecting apparatus shown in FIGS. 1 and 2 will be described. The image of the block to be coded and the image within the search range are supplied from the first and second image storage sections 11 and 12 to the first to fourth correlation calculation blocks 13a through 13d, which receive Group of Pixels ○, Group of Pixels ◇, Group of Pixels ● and Group of Pixels ◆, respectively. When any of the first to fourth correlation calculation blocks 13a through 13d is instructed to operate in response to the enable signal EN from the control section 20, the correlation calculation block calculates a total sum of the absolute values of differences between the pixels included in the group from the block to be coded and the pixels included in the group within the search range. Thus, in operation, the first correlation calculation block 13a outputs the total sum EC1 of the absolute values of differences between the pixels included in both Groups ○. In the same way, in operation, the second correlation calculation block 13b outputs the total sum EC2 of the absolute values of differences between the pixels included in both Groups ◇. Similarly, in operation, the third correlation calculation block 13c outputs the total sum EC3 of the absolute values of differences between the pixels included in both Groups ●. And, in operation, the fourth correlation calculation block 13d outputs the total sum EC4 of the absolute values of differences between the pixels included in both Groups ◆.

In the correlation determination section 14 shown in FIG. 2, the selector 14a selects any of the outputs EC1 through EC4 of the first to fourth correlation calculation blocks 13a through 13d and a numerical value "0" in response to the enable signal EN. And the selected values are added by the adder 14b. In this case, the selector 14a selects the output(s) of only the operated one(s) from the first to fourth correlation calculation blocks 13a through 13d and selects "0" for the non-operated one(s), instead of the output(s) thereof. Thus, the adder 14b outputs the total sum of the outputs of the operated ones among the first to fourth correlation calculation blocks 13a through 13d. Herein, a value obtained by adding the total sum of the absolute values of differences between the pixels included in both Groups A and the total sum of the absolute values of differences between the pixels included in both Groups B corresponds to the total sum of the absolute values of differences between the pixels included in Group A and the pixels included in Group B. Accordingly, the output of the adder 14b corresponds to the total sum of the absolute values of differences between the pixels included in the two groups supplied to the operated correlation calculation blocks, i.e., an estimated value of correlation.

The minimum value detector 14c detects a minimum value out of the estimated values of correlation output from the adder 14b, and detects a motion vector corresponding to the candidate block having the minimum estimated value of correlation.

The control section 20 selects the groups of pixels required for calculating the estimated values of correlation in accordance with the image feature information S1 of the block to be coded and the operating state information S2 of the motion vector detecting apparatus. And the control section 20 operates only the correlation calculation blocks, to which the required groups of pixels are supplied, by providing the enable signal EN thereto.

As can be understood, the motion vector detecting apparatus of the present invention selects groups of pixels, required for calculating the estimated values of correlation, from the block to be coded and the search range in accordance with the image feature information S1 and the operating state information S2. Then, the apparatus calculates the estimated values of correlation only for the selected groups of pixels, thereby detecting a motion vector. In other words, the non-selected group of pixels have been virtually decimated from the block to be coded and the search range. As a result, motion vector detection through sub-sampling is realized.

Also, since the correlation calculation blocks, to which the non-selected unnecessary groups of pixels are supplied, are not operated, the motion vector can be detected with requisite minimum power.

FIG. 3 is a block diagram illustrating an exemplary image coding apparatus including the motion vector detecting apparatus shown in FIG. 1. In FIG. 3, the reference numeral 1 denotes an image coding apparatus for generating coded data from image data. The reference numeral 41 denotes a battery as a power supply for the image coding apparatus 1. The reference numeral 42 denotes a CPU for controlling the operation of the image coding apparatus 1. The reference numeral 43 denotes a preprocessing section for preprocessing the image data to be supplied to the image coding apparatus 1. And the reference numeral 44 denotes a frame memory for storing the image data output from the image coding apparatus 1.

The image coding apparatus 1 includes: an image input section 31; a motion vector detection section 10; a discrete cosine transform (DCT) section 32; a quantization section 33; a variable length coding (VLC) section 34; and a local decode section 35 as respective processing blocks. The motion vector detecting section 10 has the configuration shown in FIG. 1. The local decode section 35 performs inverse quantization and inverse DCT on the quantized data, thereby restoring an image. A controller 30 controls the respective processing blocks. A memory interface (I/F) section 36 transfers data between the respective processing blocks and the frame memory 44.

In the configuration shown in FIG. 3, the function of the control section 20 shown in FIG. 1 is performed by the controller 30 and the CPU 42. Specifically, the controller 30 and the CPU 42 receive the image feature information S1 from the DCT section 32, the motion vector detection section 10 or the preprocessing section 43, and also receives operating state information S2 representing the power left in the battery 41. And in accordance with the information S1 and S2, the controller 30 and the CPU 42 control the motion vector detection section 10 to selectively set sub-sampling.

Next, it will be described how sub-sampling is selectively set based on the image feature information S1 and the operating state information S2.

Figure 4A:
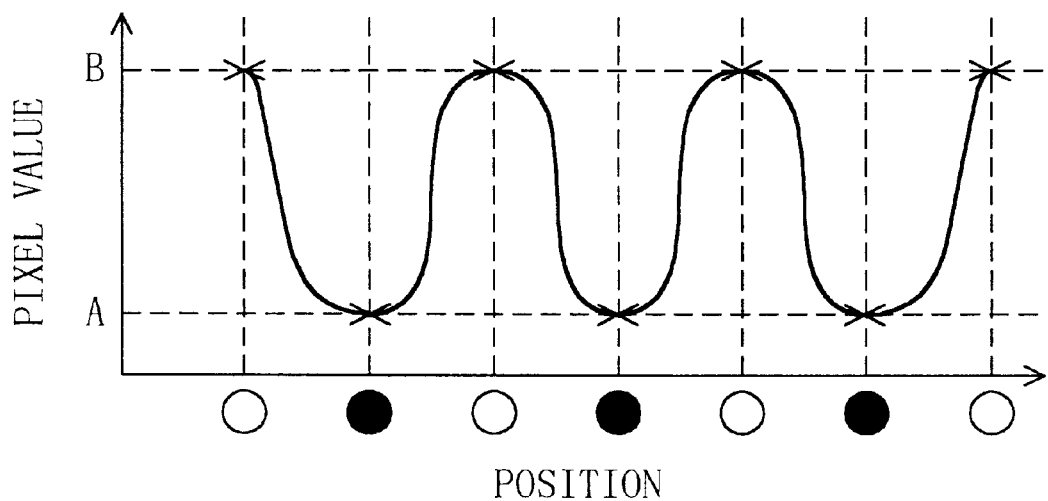
FIGS. 4(a) and 4(b) are graphs showing the relationships between images and frequency components.
Figure 4B:
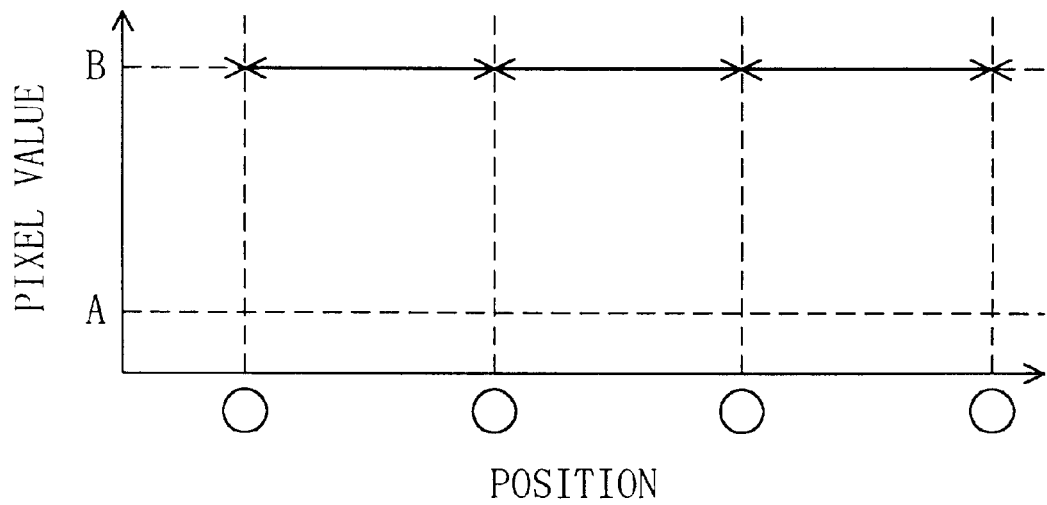

FIGS. 4(a) and 4(b) are diagrams illustrating the relationships between images and frequency components, where the axis of abscissas represents the positions of pixels and the axis of ordinates represents the values of respective pixels. FIG. 4(a) illustrates an image in which respective pixels have values A and B every other pixel. This image has frequency components having a period of two pixel intervals. FIG. 4(b) illustrates an image obtained by sub-sampling the image shown in FIG. 4(a) every other pixel. As can be understood from the comparison between FIGS. 4(a) and 4(b), the feature of the image shown in FIG. 4(a) that pixel values vary every other pixel is lost as a result of the sub-sampling performed every other pixel.

Figure 5A:
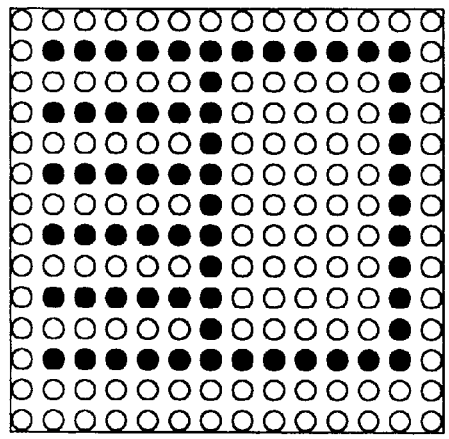
FIG. 5(a) is a diagram illustrating an exemplary image of a block to be coded.
Figure 5B:
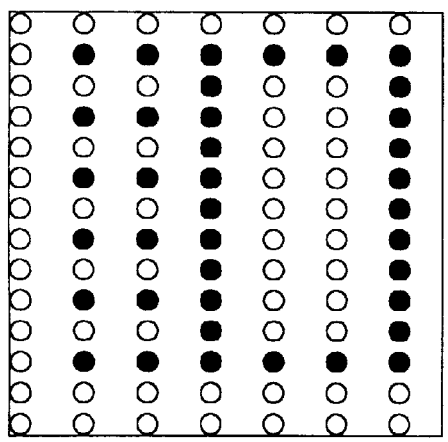
FIG. 5(b) is a diagram illustrating the results of sub-sampling performed on the image shown in FIG. 5(a) for decimating every other pixel in the horizontal direction.
Figure 5C:
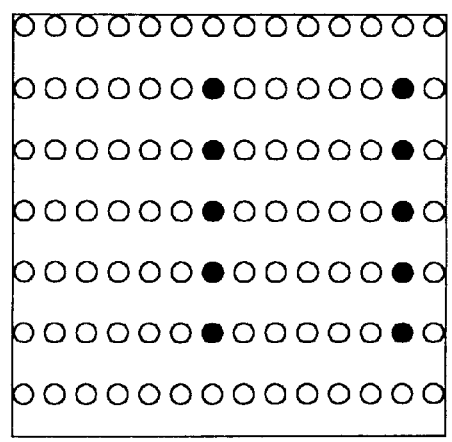
FIG. 5(c) is a diagram illustrating the results of sub-sampling performed on the image shown in FIG. 5(a) for decimating every other pixel in the vertical direction.

However, the feature of an image is sometimes lost but sometimes not lost depending upon the direction of sub-sampling and the arrangement of pixels in the image. For example, if the image of a block to be coded such as that shown in FIG. 5(a) is sub-sampled horizontally every other pixel, the results are as shown in FIG. 5(b). In this case, since the feature of the original image of the block to be coded remains even after the sub-sampling, the performance of motion vector detection does not deteriorate so much. However, if the image shown in FIG. 5(a) is sub-sampled vertically every other pixel, then the feature of the original image of the block to be coded does not remain after the sub-sampling has been performed as shown in FIG. 5(c). In such a case, the performance of motion vector detection does deteriorate and an erroneous motion vector is possibly detected.

That is to say, in the case of employing sub-sampling, if the feature of the original image does not remain after the sub-sampling has been performed, an erroneous motion vector is possibly detected. Thus, in this embodiment, sub-sampling is selectively set by using the frequency components of the block to be coded as the image feature information S1.

In the configuration shown in FIG. 1, if attention is paid to an image vertically, then calculating the estimated values by using Groups of Pixels ○ and ◇ (or Groups of Pixels ● and ◆) is equivalent to detecting a motion vector without sub-sampling, while calculating the estimated values by using Group of Pixels ○ only is equivalent to detecting a motion vector with sub-sampling every other pixel.

Thus, for example, if the image of a block to be coded has frequency components having a period of two pixel intervals in the vertical direction, then vertical sub-sampling is not performed so as not to lose the frequency components. Accordingly, the estimated values are calculated by using Groups of Pixels ○ and ◇ (or Groups of Pixels ● and ◆. On the other hand, if the image of a block to be coded does not have frequency components having a period of two pixel intervals in the vertical direction, then the estimated values are calculated by using Group of Pixels ○ only. Setting of sub-sampling may be performed similarly when attention is paid to an image horizontally.

The operating state information S2 includes whether an image coding apparatus is operated in a mobile state or in an immobile state. Specifically, if the apparatus is operated in an immobile state, then power can be stably supplied thereto in general. Thus, it is preferable to maximize the performance of motion vector detection without performing sub-sampling. On the other hand, if the apparatus is operated in a mobile state, it is sometimes preferable to perform sub-sampling depending upon how much power is left in the battery or how much time the apparatus is to used thereafter.

Figure 6:
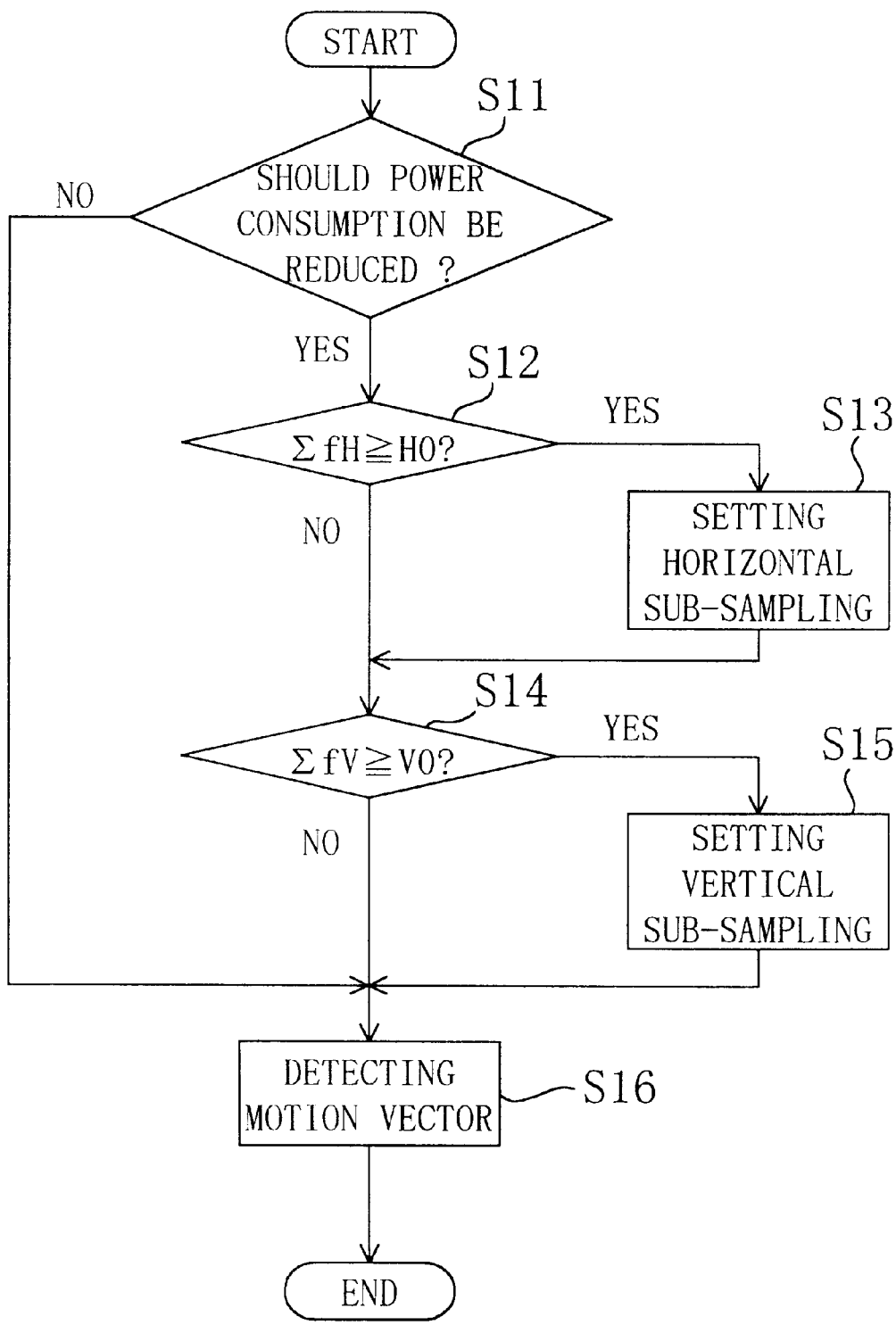
FIG. 6 is a flow chart showing the flow of a sub-sampling setting process in one embodiment of the present invention.

Hereinafter, the setting of sub-sampling will be specifically described. FIG. 6 is a flow chart illustrating the flow of sub-sampling setting processing in this embodiment.

In Step S11, the CPU 42 receives information indicating the power left in the battery 41 as the operating state information S2. In view of not only the information S2 but also other information about the preset operating time and the like, the CPU 42 instructs the image coding apparatus 1 whether or not the power consumption should be reduced. If it is not necessary to reduce the power consumption, motion vector detection is performed without sub-sampling while respecting the performance of motion vector detection more than the reduction of power consumption.

On the other hand, if it is necessary to reduce the power consumption, the controller 30 sets sub-sampling in accordance with the image feature information S1. Herein, the DCT components obtained by the DCT section 32 for the block to be coded are used as the image feature information S1. The discrete cosine transform is an orthogonal transform using a cosine function as a base function, and is a calculation for obtaining the frequency components included in the object to be transformed.

Figure 7:
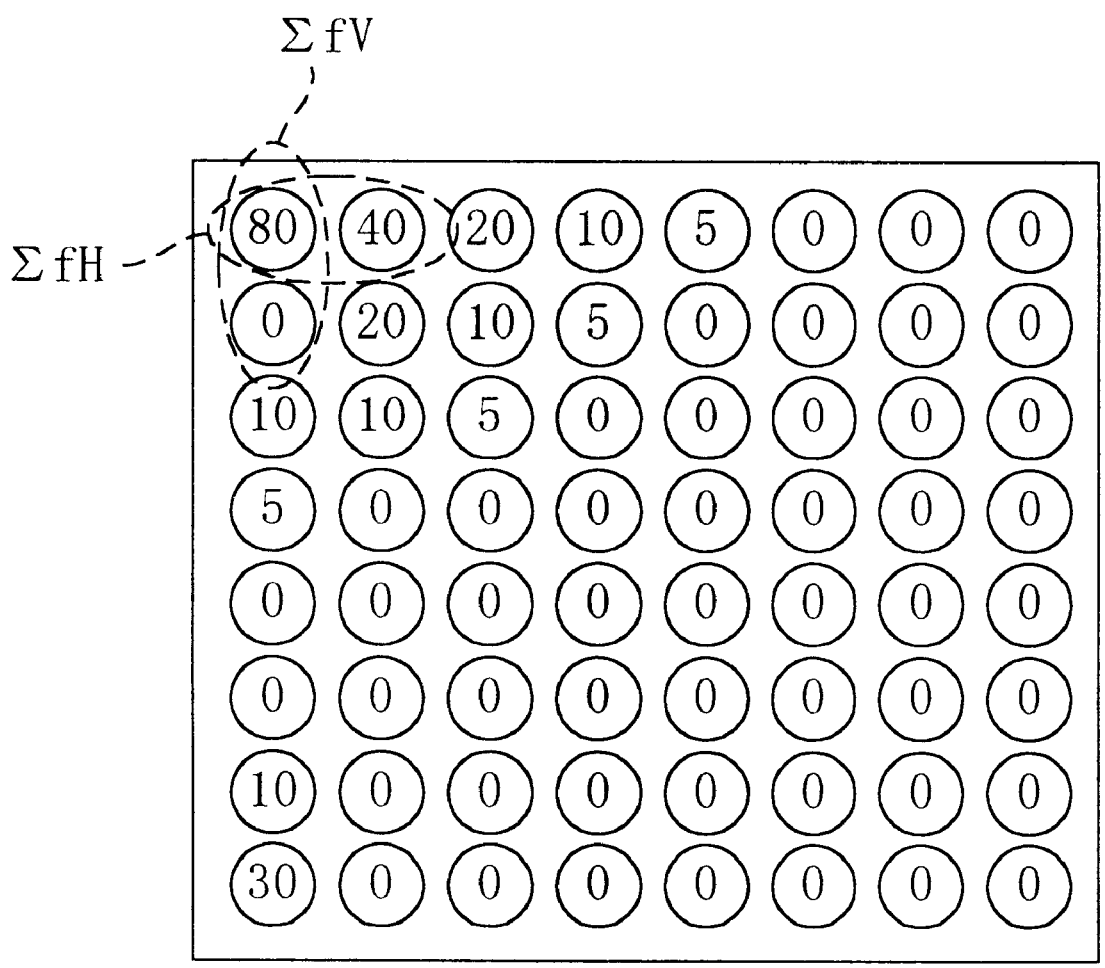
FIG. 7 is a diagram illustrating exemplary DCT components of a block to be coded.
Figure 8:
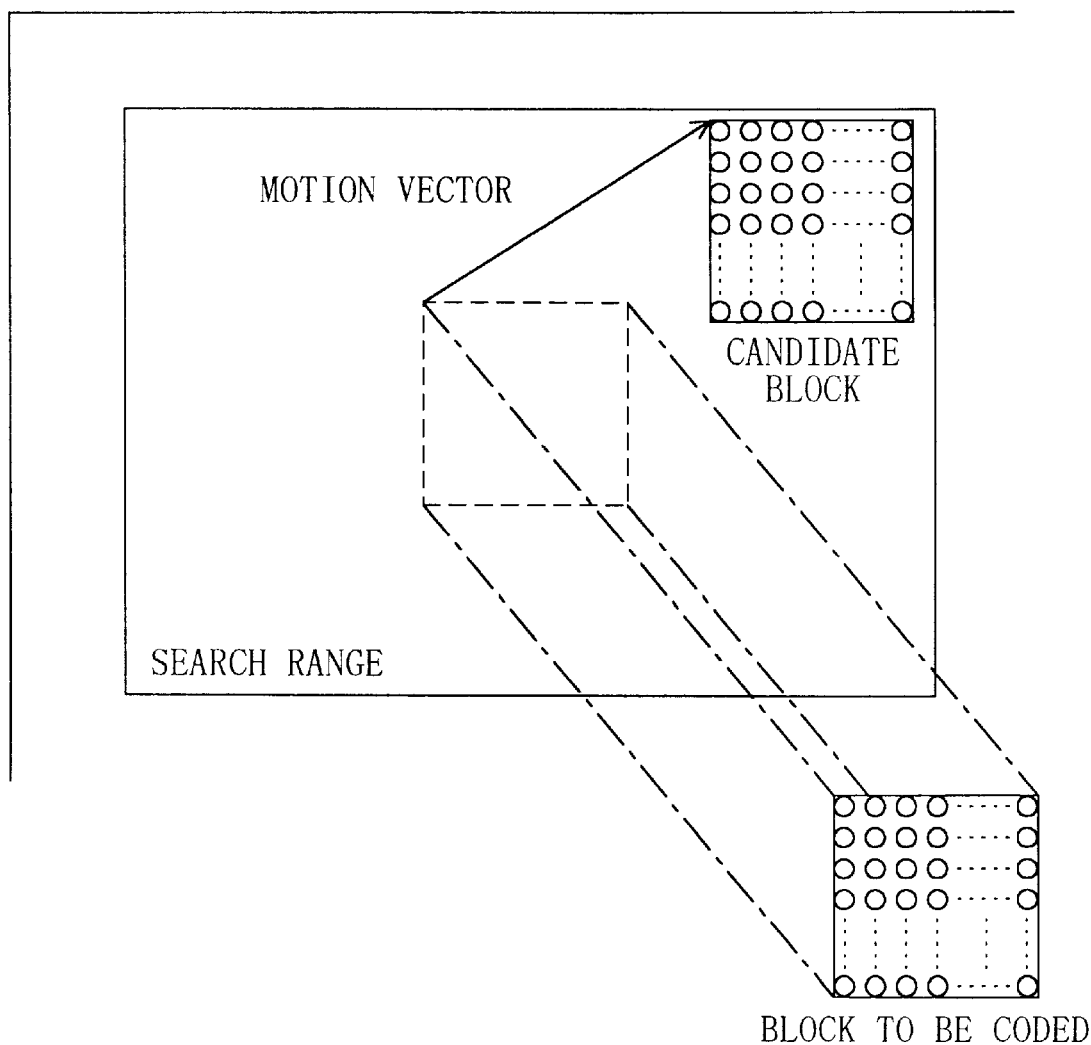
FIG. 8 is a conceptual diagram illustrating a block matching method.

FIG. 7 illustrates exemplary DCT components for a block to be coded. The DCT components such as those shown in FIG. 7 represent the distribution of frequency components in the block to be coded. Specifically, in FIG. 7, the larger the value of a component located in the vicinity of the upper left corner is, the larger number of low-frequency components exist. Conversely, the larger the value of a component located in the vicinity of the lower right corner is, the larger number of high-frequency components exist.

In FIG. 7, the variation of the component values in the horizontal direction represents the frequency distribution in the horizontal direction, and the variation of the component values in the vertical direction represents the frequency distribution in the vertical direction. In the example shown in FIG. 7, the frequency in the horizontal direction is low, whereas the frequency in the vertical direction is high. Thus, horizontal sub-sampling is preferably performed, but vertical sub-sampling is preferably not performed. In such a case, in the configuration shown in FIG. 1, the power consumption can be reduced by operating only the first and second correlation calculation blocks 13a and 13b.

Herein, the sum of the values of two leftmost components on the uppermost row is assumed to be a horizontal frequency value $\Sigma fH$, while the sum of the values of two uppermost components on the leftmost column is assumed to be a vertical frequency value $\Sigma fV$. By using the horizontal and vertical frequency values $\Sigma fH$ and $\Sigma fV$, the sub-sampling is set horizontally and vertically.

In Step S12, if the horizontal frequency value $\Sigma fH$ is equal to or larger than a predetermined value H0, then the horizontal frequency of the block to be coded is determined low and it is determined in Step S13 that horizontal sub-sampling should be performed. On the other hand, if the horizontal frequency value $\Sigma fH$ is smaller than the predetermined value H0, then the horizontal frequency of the block to be coded is determined high and horizontal sub-sampling is not performed.

In Step S14, if the vertical frequency value $\Sigma fV$ is equal to or larger than a predetermined value V0, then the vertical frequency of the block to be coded is determined low and it is determined in Step S15 that vertical sub-sampling should be performed. On the other hand, if the vertical frequency value $\Sigma fV$ is smaller than the predetermined value V0, then the vertical frequency of the block to be coded is determined high and vertical sub-sampling is not performed.

In Step S16, a motion vector is detected in accordance with the setting of sub-sampling.

An image coding apparatus for detecting a motion vector generally includes a DCT section, and therefore there is no need to provide a new function for calculating DCT components therefor. However, in a general image coding processing flow, the DCT calculation is performed after the motion vector has been detected. Thus, if the DCT components are to be used for setting sub-sampling as is done in this embodiment, not only an originally intended DCT calculation but also an additional DCT calculation for setting sub-sampling are required to be performed, which adversely increases the quantity of calculation.

Thus, sub-sampling may be set by making the preprocessing section 43 extract the image feature, such as DCT components, of the block to be coded. For example, the CPU 42 may make the controller 30 set the sub-sampling mode during the motion vector detection in accordance with the image feature information S1 supplied from the preprocessing section 43. Alternatively, the controller 30 may set the sub-sampling mode during the motion vector detection in accordance with the image feature information S1 supplied from the image input section 31.

Even for a moving picture, the image is hardly varied for a short period of time. Thus, the DCT components of a block, which is located at the same position as the block to be coded in a frame previous to the target frame and which have already been calculated, may also be used for setting sub-sampling. Moreover, in most cases, a block has a similar image feature to that of a neighboring block. Thus, the DCT components of a block in the vicinity of the block to be coded or the DCT components of a block located at the same position as the block to be coded in a frame previous to the target frame may be used for setting sub-sampling.

As the image feature information S1, not only the frequency components but also information about the motion of an image may be used. Specifically, in view of the fact that the resolution of human eyes decreases when one sees an object moving fast, sub-sampling may be performed if the block to be coded moves to a large extent, but may not be performed if the motion is small. As the image feature information S1 representing the motion of the block to be coded, the motion vector of a block, which is located at the same position as or in the vicinity of the block to be coded in a frame previous to the target frame and which has already been detected, may be used.

In this embodiment, the image of the block to be coded and the image within the search range are each classified into four groups of pixels and the correlation calculation section 13 is constituted by four correlation calculation blocks 13a through 13d. However, the present invention is not limited to such a configuration. For example, if the pixels are sub-sampled every second pixel horizontally and every third pixels vertically, then the image of the block to be coded and the image within the search range should be classified into six (=2×3) groups of pixels. In such a case, six correlation calculation blocks need to be provided for the respective groups of pixels. Also, a single correlation calculation block may be used in common for plural groups of pixels. In such a case, the number of correlation calculation blocks becomes smaller than the number of the groups of pixels.

Herein, the quantity of calculation performed by the motion vector detection section 10 becomes 100 to 1,000 times as large as those of the other processing blocks in the image coding apparatus 1. Specific numeric examples will be described. In accordance with a block matching method, the quantity of calculation for obtaining estimated values is: (number of times of calculation per pixel)×(number of pixels in block to be coded)×(number of candidate blocks). Assume the number of times of calculation (calculation of absolute values of differences) per pixel is 3, the number of pixels in the block to be coded is 256 (=16×16) and the number of candidate blocks is 1024. Then, the quantity of calculation per block to be coded is "786,432". A moving picture, which has a size of 720 horizontal pixels by 480 vertical pixels and consists of 30 images per second, includes 40,500 blocks to be coded (each consisting of 16×16 pixels) per second. Thus, the motion vector detection section 10 is required to perform as enormous calculations as about 31 GOP's, thereby consuming huge power. In view of the layouts of currently available image coding LSI's, the power consumption of the motion vector detection section 10 presumably corresponds to about ½ to about ¼ of the power consumed by the entire apparatus.

Thus, in order to reduce the power consumption of the overall image coding apparatus, the present inventors paid special attention to the motion vector detection section 10 consuming particularly much power. According to the present invention, sub-sampling, one of the techniques for detecting a motion vector with reduced power, is employed and is adaptively set in accordance with the operating state of the image coding apparatus and the features of images. Specifically, if the power consumption should be reduced (like when there is not so much power left in the battery of a mobile unit), sub-sampling is employed as a matter of principle. However, by avoiding the use of sub-sampling for an image having high-frequency components so as to prevent the quality of the image from being deteriorated, the present invention can reduce power consumption while simultaneously maintaining the image quality. Thus, the present invention is effectively applicable to the use of a battery-driven apparatus such as a mobile unit in a long-time mode and to the power saving control in accordance with the power left in the battery.

As is apparent from the foregoing description, the present invention adaptively sets sub-sampling in accordance with the image feature information such as the frequency components of a block to be coded and the operating state information such as the power left in a battery. As a result, a motion vector can be detected more appropriately than conventional technologies in terms of detection performance and power consumption. Also, correlation calculation blocks are selectively operated in accordance with the setting of sub-sampling, thereby detecting a motion vector with requisite minimum power.

What is claimed is:

1. A motion vector detecting apparatus comprising:
    first image storage means for storing an image of a block to be coded;
    second image storage means for storing an image within a search range;
    correlation calculation means including a plurality of correlation calculation blocks for calculating correlation between the block to be coded and each associated candidate block within the search range, each said correlation calculation block being supplied with a different group of pixels out of the block to be coded from the first image storage means and an associated group of pixels out of each said associated candidate block from the second image storage means and calculating the correlation between the two groups of pixels supplied;
    control means for controlling the correlation calculation means by selectively operating at least one of the correlation calculation blocks; and
    correlation determination means for determining the correlation between the block to be coded and each said associated candidate block based on an output of the correlation calculation block operated in accordance with the control of the control means.

2. The motion vector detecting apparatus of claim 1, wherein the correlation determination means comprises:
    a selector, receiving the outputs of the correlation calculation blocks, for selectively outputting the output of the correlation calculation block operated in accordance with the control of the control means; and
    an arithmetic unit for calculating the correlation between the block to be coded and each said associated candidate block based on the output of the selector.

3. The motion vector detecting apparatus of claim 1, wherein if sub-sampling is performed during the detection of a motion vector, the control means operates part of the correlation calculation blocks,
    and wherein if sub-sampling is not performed, the control means operates all of the correlation calculation blocks.

4. The motion vector detecting apparatus of claim 1, wherein the control means selects at least one of the correlation calculation blocks in accordance with image feature information of the block to be coded.

5. The motion vector detecting apparatus of claim 4, wherein the image feature information is frequency components of the image of the block to be coded.

6. The motion vector detecting apparatus of claim 1, wherein the control means selects at least one of the correlation calculation blocks in accordance with operating state information of the motion vector detecting apparatus.

7. The motion vector detecting apparatus of claim 6, wherein the operating state information is about power supplied to the motion vector detecting apparatus.

8. The motion vector detecting apparatus of claim 1, wherein the number of the correlation calculation blocks is four.

9. A method for detecting a motion vector, comprising the steps of:

a) calculating correlation between a block to be coded in a target frame and each associated candidate block within a search range in a search frame; and b) detecting the motion vector of the block to be coded based on the correlation calculated in the step a), wherein in the step a), sub-sampling during the calculation of correlation is selectively set in accordance with image feature information of the block to be coded.

10. The method of claim 9, wherein frequency components of an image of the block to be coded are used as the image feature information.

11. The method of claim 9, wherein DCT components of a block in a frame previous to the target frame are used as the image feature information, the block in the previous frame being located at the same position as or in the vicinity of the block to be coded.

12. The method of claim 9, wherein a motion vector of a block in a frame previous to the target frame is used as the image feature information, the block in the previous frame being located at the same position as or in the vicinity of the block to be coded.

13. The method of claim 9, wherein sub-sampling is selectively set in accordance with not only the image feature information but also operating state information of an apparatus implementing the method.

14. The method of claim 13, wherein information indicating whether the apparatus implementing the method is operated in a mobile state or in an immobile state is used as the operating state information.

15. The method of claim 13, wherein information indicating power left in a battery functioning as a power supply for the apparatus implementing the method is used as the operating state information.

16. A method for detecting a motion vector, comprising the steps of:

a) calculating correlation between a block to be coded in a target frame and each associated candidate block within a search range in a search frame; and b) detecting the motion vector of the block to be coded based on the correlation calculated in the step a), wherein in the step a), sub-sampling during the calculation of correlation is selectively set in accordance with operating state information of an apparatus implementing the method.

17. The method of claim 16, wherein information indicating whether the apparatus implementing the method is operated in a mobile state or in an immobile state is used as the operating state information.

18. The method of claim 16, wherein information indicating power left in a battery functioning as a power supply for the apparatus implementing the method is used as the operating state information.

19. An image coding apparatus for motion compensated coding a moving picture, comprising a motion vector detecting section for calculating correlation between a block to be coded in a target frame and each associated candidate block within a search range in a search frame and thereby detecting the motion vector of the block to be coded based on the correlation calculated, wherein the motion vector detecting section selectively sets sub-sampling during the calculation of the correlation in accordance with image feature information of the block to be coded.

20. The image coding apparatus of claim 19, further comprising a DCT section for performing a discrete cosine transform on an image, wherein the motion vector detecting section selectively sets sub-sampling by using DCT components of a block in a frame previous to the target frame as the image feature information, the DCT components being obtained by the DCT section, the block in the previous frame being located at the same position as or in the vicinity of the block to be coded.

21. The image coding apparatus of claim 19, wherein the motion vector detecting section selectively sets sub-sampling by using a motion vector of a block in a frame previous to the target frame as the image feature information, the block in the previous frame being located at the same position as or in the vicinity of the block to be coded.

* * * * *